United States Patent
Coleman, Sr.

(10) Patent No.: US 8,259,816 B2
(45) Date of Patent: Sep. 4, 2012

(54) SYSTEM AND METHOD FOR STREAMING VIDEO TO A MOBILE DEVICE

(75) Inventor: Marquis R. Coleman, Sr., Detroit, MI (US)

(73) Assignee: MIST Innovations, Inc., Detroit, MI (US)

( * ) Notice: Subject to any disclaimer, the term of this patent is extended or adjusted under 35 U.S.C. 154(b) by 465 days.

(21) Appl. No.: 12/402,595

(22) Filed: Mar. 12, 2009

(65) Prior Publication Data

US 2010/0232518 A1 Sep. 16, 2010

(51) Int. Cl.
*H04N 7/12* (2006.01)

(52) U.S. Cl. .................................. 375/240.26

(58) Field of Classification Search .................. 725/105; 375/240.26; *G06K 9/36*
See application file for complete search history.

(56) References Cited

U.S. PATENT DOCUMENTS

| | | | |
|---|---|---|---|
| 6,882,686 B2 | 4/2005 | Jayant | |
| 7,007,098 B1 | 2/2006 | Smyth | |
| 7,058,721 B1 | 6/2006 | Ellison | |
| 7,769,237 B2 * | 8/2010 | Kadatch | 382/232 |
| 2006/0098650 A1 * | 5/2006 | Beninato et al. | 370/389 |
| 2007/0201492 A1 | 8/2007 | Kobayashi | |
| 2008/0137737 A1 | 6/2008 | Fernandes | |
| 2008/0137738 A1 | 6/2008 | Fernandes | |
| 2008/0288986 A1 | 11/2008 | Foster | |
| 2010/0013918 A1 * | 1/2010 | Ta'Eed | 348/143 |

* cited by examiner

*Primary Examiner* — David Czekaj
*Assistant Examiner* — Tracy Li
(74) *Attorney, Agent, or Firm* — Brooks Kushman P.C.

(57) ABSTRACT

Systems and methods for streaming video information to a hand-held device include dynamically modifying video image properties of captured video frames to generate video data packets of a size suitable for transmission over a low bit-rate channel to a hand-held device for viewing. The systems and methods may dynamically and automatically control image properties via a hardware capture card device driver to produce a video data packet of a desired maximum data size such that subsequent compression and coding strategies produce a data packet suitable for transmission to the hand-held device for decoding and decompression to display the streaming video in near real-time.

31 Claims, 5 Drawing Sheets

SYSTEM AND METHOD FOR STREAMING VIDEO TO A MOBILE DEVICE

BACKGROUND

1. Technical Field

Embodiments of the present disclosure relate to systems and methods for streaming video to a mobile device.

2. Background Art

Various strategies have been developed to transmit video information over transmission channels of different bandwidths and reliability. System design parameters are often application specific and may be selected based on a number of considerations, such as the desired size and quality of the received video image (including resolution, frame rate, color depth, etc.), the latency between transmitting and receiving the video, the efficiency and reliability of the transmission network(s), and the processing capabilities of the transmitting and receiving devices, for example. Transmission of live broadcasts or near real-time video information of acceptable quality is particularly challenging over wireless networks, such as cellular networks, due to the relatively low bandwidth and low integrity transmission, i.e. lost or dropped data packets. In addition, hand-held devices, such as cell phones, PDAs, and various other hand-held computing/communication devices may have limited processing capabilities and proprietary operating systems and applications. Time-insensitive video streams that are significantly time-delayed or previously stored allow sufficient processing prior to transmission to facilitate sending of the video over such networks using appropriate coding and compression strategies. These applications often do not actually stream the video, but allow for a complete segment of video data to be transmitted to the receiving device prior to processing and play back by the device. These applications are therefore not appropriate for live broadcasts or time-sensitive video information, such as used in security and surveillance applications, for example.

SUMMARY

Systems and methods for streaming video information to a hand-held device include dynamically modifying video image properties of captured video frames to generate video data packets of a size suitable for transmission over a low bit-rate channel to a hand-held device for viewing. The systems and methods may dynamically and automatically control image properties via a hardware capture card device driver to produce a video data packet of a desired maximum data size. The maximum size of the data packet may be determined such that subsequent compression and coding strategies produce a data packet suitable for transmission to the hand-held device for decoding and decompression to display the streaming video in near real-time on the hand-held device.

Embodiments of the present disclosure include a method for streaming video over a cellular network to a hand-held device in response to a request for streaming video from the hand-held device. The method may include determining that the hand-held device is authorized to receive requested streaming video prior to initiating video streaming. Once initiated, the method may include transforming output from a camera to a first color palette, adjusting each of a plurality of image properties until a captured video frame data size is below a first threshold associated with cellular network bandwidth, converting the captured video frame data to a bitmapped image format using a lossless compression algorithm to generate a first compressed frame in a format native to the hand-held device, compressing or coding the first compressed frame using at least a second lossless compression algorithm to generate a compressed packet for transmission; and transmitting the compressed packet over a wireless network to the hand-held device for display on the hand-held device. In one embodiment the video data is first compressed by converting to at least one PNG format before being compressed by an arithmetic coding process. The method may include various additional data manipulation to enhance compression, such as combining multiple frames into a single frame before compression and/or determining differences between frames and compressing and transmitting only the differences with the complete frames rendered by the display device after decompression.

Embodiments may also include a system for streaming video over a cellular network to a hand-held computing device with a display screen where the system includes at least one video source and a server having a video capture card in communication with the at least one video source. The server includes a video capture card device driver and software that controls the device driver to automatically adjust each of a plurality of image properties until a captured video frame data size is below a first threshold associated with currently available bandwidth of the cellular network. The server converts captured video frames to a bitmapped image format using a lossless compression algorithm to generate compressed video frames and then further compresses the compressed video frames using a second lossless compression algorithm to generate compressed packets for transmission. The compressed packets are streamed over the cellular network to the hand held computing device for sequential display on the display screen. Compressed packets may be streamed via the internet to a cellular network service provider for wireless transmission to the hand-held computing device. In one embodiment, video streaming is initiated and/or controlled in response to an authenticated request from a hand-held computing device such as a cellular telephone, PDA, or similar device. The server may interface with an alert/alarm system and send a message to the hand-held device in response to a triggering event to provide video surveillance via the hand-held device.

The present disclosure includes embodiments having various advantages. For example, embodiments according to the present disclosure combine or cascade various compression, encoding/decoding, and data reduction strategies to generate a lightweight or lower bandwidth stream of data packets representing video information for transmission to a portable hand-held device over a relatively low bandwidth/bit-rate, and generally unreliable network, such as a cellular network, for example. The data packets received by the mobile device are manipulated in near real-time to produce a recognizable video stream on the mobile device.

Embodiments of the present disclosure may include various security features so that only authorized users may initiate, control, and view a selected video stream. A client/server architecture employing a hardened server with a minimal operating system allows the server to be installed on the public side of a network firewall, or in a firewall demilitarized zone, if desired. To enhance security of the video stream, video data from one or more cameras may be captured and processed or packetized for transmission only when requested by an authorized mobile device, with authorized mobile devices determined by an authentication process that may require a valid mobile device ID code in addition to a PIN or password entered by a user to protect against unauthorized access to the video stream if the mobile device is lost or stolen. Once authenticated, a mobile user can select from available video streams and may have the ability to remotely control one or more video sources. A single server may process data from multiple cameras providing near real-time video streaming to multiple users substantially simultaneously.

Various embodiments of the present disclosure transmit packetized video data using streaming technology native to the mobile devices for display of still images, i.e. developed specifically for mobile devices to facilitate viewing of full motion video over a low bit-rate network, i.e. at less than modem speeds, such as a cellular network. In addition, systems and methods of the present disclosure may utilize a client application based on video player technology rather than web page still image display technology to reduce transmission bandwidth and processing requirements of the mobile device.

Embodiments of the present disclosure may be easily integrated into existing video surveillance or security applications interfacing with access control, intrusion detection, security, and automation systems, for example. Alerts, such as text messages, emails, or other information may be transmitted to mobile users in response to a security trigger being activated at a monitored site.

The above advantages and other advantages and features will be readily apparent from the following detailed description of the preferred embodiments when taken in connection with the accompanying drawings.

BRIEF DESCRIPTION OF THE DRAWINGS

Various features of the embodiments described herein are explicitly described and/or illustrated. However, various other features of the embodiments that may not be explicitly described or illustrated will be apparent to one of ordinary skill in the art. The various embodiments may be best understood by referring to the following detailed description in conjunction with the accompanying drawings, in which.

DETAILED DESCRIPTION OF THE EMBODIMENT(S)

As those of ordinary skill in the art will understand, various features of the embodiments illustrated and described with reference to any one of the Figures may be combined with features illustrated in one or more other Figures to produce embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments described relate generally to streaming of video data over a narrow bandwidth and/or low bit-rate channel to a hand-held mobile device, such as a cell phone or PDA, to provide near real-time viewing of time-sensitive video information, such as a live broadcast or video surveillance, for example. However, the teachings of the present disclosure may also be used in various other types of applications that may benefit from compressing and encoding of data for transmission over a low bandwidth channel to facilitate near real time reconstruction on a hand-held device.

Various Figures include block diagrams and/or flow charts to illustrate operation of a system or method for video streaming according to embodiments of the present disclosure. Such illustrations generally represent control logic and/or program code that may be performed by software and/or hardware to accomplish the functions illustrated and may include various ancillary functions well known by those of ordinary skill in the art. While specific representative implementations may be described for one or more embodiments, this disclosure is independent of the particular hardware or software described. The diagrams may represent any of a number of known processing strategies such as event-driven, interrupt-driven, multi-tasking, multi-threading, and the like performed by one or more processors deployed in integrated or discrete hardware. As such, various functions illustrated may be performed in the sequence illustrated, in parallel, or in some cases omitted. Likewise, the order of processing is not necessarily required to achieve the features and advantages of the disclosure, but is provided for ease of illustration and description. The control logic may be embodied in a computer readable medium, such as a hard disk, CD ROM, PROM, EPROM, etc. and may be implemented by program code or software executed by a microprocessor. Of course, various aspects of the control logic may also be implemented by dedicated hardware that may include embedded special-purpose processors consistent with the teachings of the present disclosure.

Figure 1:
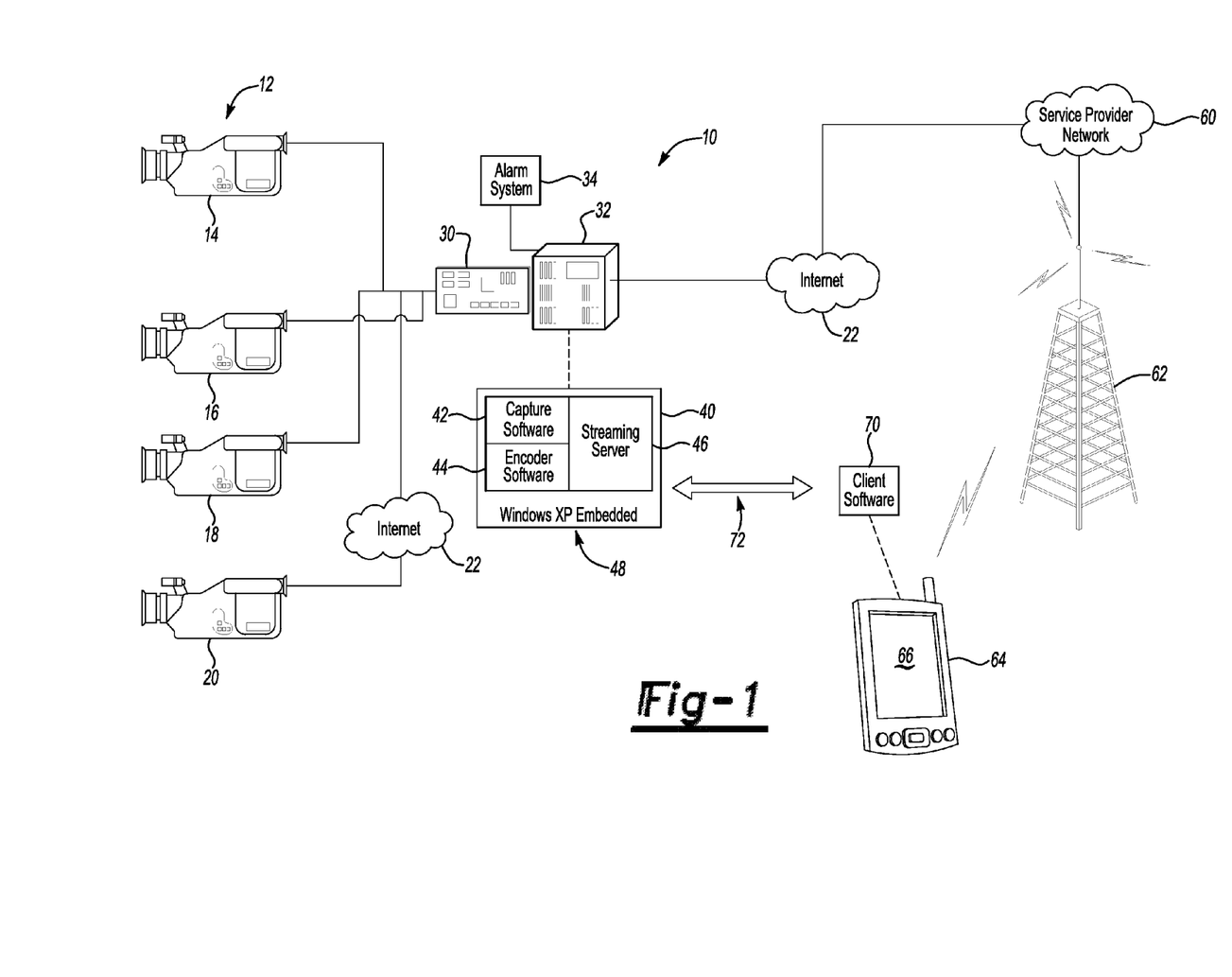
FIG. 1 is a block diagram illustrating operation of a system or method for streaming video to a hand-held portable device according to various embodiments of the present disclosure.

FIG. 1 is a block diagram illustrating operation of a system or method for streaming video to a hand-held device according to one embodiment of the present disclosure. System 10 includes at least one video source 12. In the illustrated embodiment, video source 12 includes cameras 14, 16, 18, directly connected to video capture card 30 of server 32, while camera 20 may be indirectly connected to video capture card 30 over a wired or wireless local-area or wide-area network, such as the Internet 22, for example. Various types of digital or analog cameras may be used as a video source 12 including conventional closed-circuit (CCTV) cameras or web cams connected directly via a BNC, coax, or USB cable, for example. Cameras connected via wired or wireless networks may communicate using any common network protocol, such as TCP/IP, for example. Cameras provide analog or digital video signals in one or more standard formats, such as RGB or YUYV to video capture card 30 installed in server computer 32. In one embodiment, raw video data is captured via video capture card 30 contained in a PCI slot of the server computer with capture card 30 supporting up to 16 cameras. Server computer 32 may support multiple video capture cards depending on the available processor(s) and memory and the required processing time to achieve a desired low latency to provide near real-time streaming video to multiple hand-held mobile devices simultaneously. As those of ordinary skill in the art will appreciate, different types of video sources may require corresponding video capture cards, or the capture card may be eliminated for digital video sources capable of providing video data in a suitable format for subsequent processing. Likewise, the number of video sources 12 or video cards 30 will generally be limited by the processing capabilities of server computer 32 because the compression and coding strategies used to provide near real-time video streaming are processor intensive.

Server computer 32 may include commercially available hardware and software in addition to software and/or hardware used to implement the video streaming functions described herein and represented generally by reference numeral 40. For example, in one embodiment, server computer 32 is a wall mount or rack mount computer having a dual-core Intel Pentium4® processor with 512 MB to 4 GB of RAM, a 1 GB flash drive, USB/Ethernet/Serial ports, at least one video capture card 30 and associated device driver and/or application software 42 corresponding to the number/type of video source(s) 12, and an optional audio card/speakers (not shown) and an optional video card/monitor (not shown). As described in greater detail below, a representative embodiment of the encoder software 44 has been designed to run on a Win32 operating system, such as Windows 98 SE®, Windows ME®, Windows 2000®, or Windows XP® with the streaming server software 46 running on Windows 2003 Server®, Windows 2000® Workstation or Server, and Windows XP®. As those of ordinary skill in the art will appreciate, server 32 may utilize a hardened (more secure and less vulnerable to hacking attacks), minimal operating system allowing server 32 to be installed on the public side of a network firewall or in the firewall demilitarized zone (DMZ) without additional protections.

In one embodiment server computer 32 has Windows XP Embedded® as its operating system 48. Of course, the video streaming system and method of the present disclosure may be ported to various other hardware/software platforms depending upon the particular application and implementation and the teachings of the present disclosure are independent of the selected platform.

In a representative security or surveillance application as illustrated in FIG. 1, server 32 may also be connected to an alarm system 34 via an appropriate data acquisition or ADC card. In one embodiment, a data acquisition device connects to server computer 32 through a serial port and connects to alarm system 34 through a low-voltage copper pair at an appropriate point where a voltage exceeding a predetermined threshold would indicate an alarm or alert triggering condition. For example, the data acquisition device may be connected to the alarm system signal horn so that alarm system 34 triggers server 32 via the data acquisition device when the alarm system signal horn is activated. Use of a data acquisition device, ADC card, or similar device facilitates integration of the video streaming/surveillance functions with any existing security system. Various other alarm system interfaces may be provided to existing access control, intrusion detection, security and/or automation systems with corresponding triggering/alert signals supplied to server 32 with each alert or triggering signal associated with one or more video sources 12 so that an authorized remote user can be alerted based on a triggering condition and receive associated near real-time streaming video on a portable hand-held device 64 as described in greater detail below.

Server computer 32 is connected to a high bandwidth local-area or wide-area network, such as the Internet 22, via an always-on connection, such as DSL, cable, Ti or ISDN connection, for example. Server computer 32 provides one or more requested video streams to a cellular network service provider 60 for wireless transmission via cell tower 62 to a mobile hand-held computing device 64, such as a cell phone or PDA, for example. Hand-held device 64 includes client software 70 that executes an authentication process to establishe a logical connection 72 with server 32 to receive and display streaming video on an associated display 66. Hand-held computing device 64 may be implemented by a Pocket PC®, SmartPhone®, RIM Blackberry®, Palm Garnett®, or similar device, for example. Client software 70 may include various communications functions to receive alerts, provide authentication, select/control video source 12, decode/decompress video frame packets, and display/render frames to provide streaming video to the user as illustrated and described in greater detail with reference to FIG. 6.

As generally illustrated in the representative security/surveillance embodiment of FIG. 1, a system or method for streaming video in near real-time having camera-to-user latencies as low as 6 seconds may receive an alert or trigger signal from alarm system 34 via an appropriate server interface as previously described. Server 32 sends a corresponding alert message, such as a text message, email, etc. to hand-held device 64. Hand-held device 64 transmits authentication information that may include an automatically transmitted device ID and user PIN or password to request streaming video from one or more cameras associated with the alert condition and directly or indirectly connected to server 32. To enhance security, server 32 transmits video from video source(s) 12 only in response to an authenticated request and streams the video directly from server 32 to hand-held communication device 64. Once an authenticated logical connection 72 is established, hand-held device 64 may be used to initiate/select a video stream from cameras 14, 16, 18, and/or 20. As described in greater detail with reference to FIGS. 2-6, server 32 cascades various technologies to capture, format, compress, and encode the video information to achieve an overall lightweight (low overhead) data packet for transmission while retaining image properties that keep the video stream recognizable. The process may be dynamically adjusted based on available cellular network bandwidth and picture viewing requirements.

Figure 2:
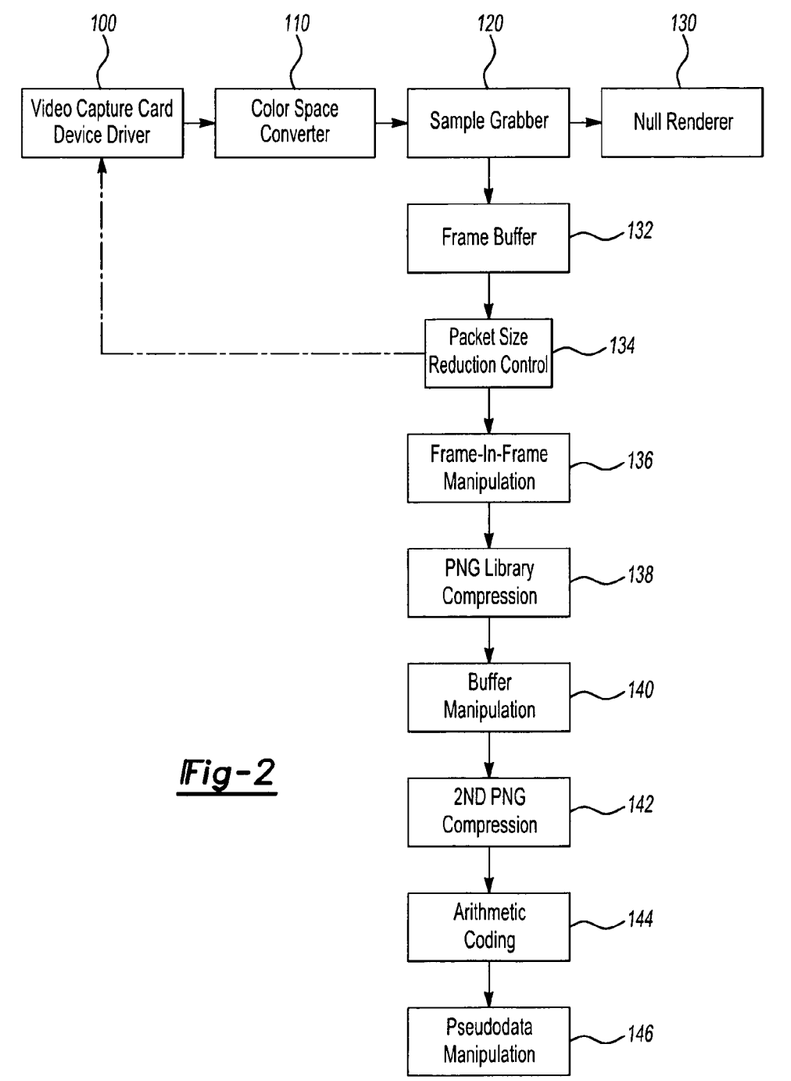
FIG. 2 is a block diagram or flow chart illustrating operation of one embodiment for packetizing video data for transmission over a low bit-rate channel or network, such as a cellular network, according to the present disclosure.
Figure 3:
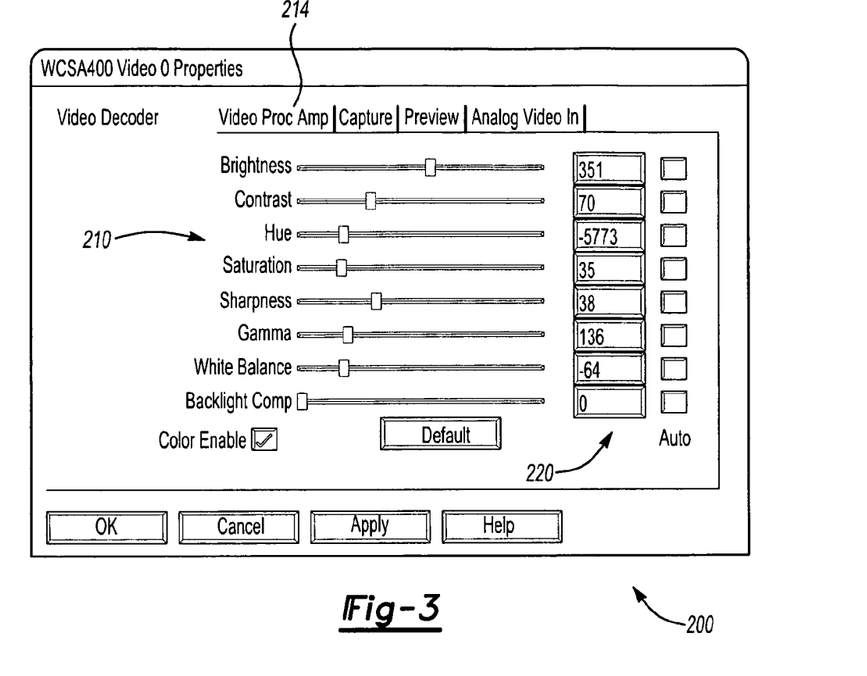
FIG. 3 illustrates a graphical user interface for manually controlling image properties or attributes that may be automatically adjusted to reduce packet size of captured video frames according to embodiments of the present disclosure.

FIGS. 2 and 3 illustrate a representative embodiment of functions performed by server 32 (FIG. 1). FIG. 2 is a block diagram/flowchart illustrating operation of a system or method for packetizing video data for transmission over a low bit-rate channel or network, such as a cellular network, according to one embodiment of the present disclosure. The functions illustrated in FIG. 2 are implemented by software and/or hardware of server 32 (FIG. 1). A raw video signal in NTSC, PAL, or digital format is provided to a video capture card contained in a peripheral slot of server 32. An associated video capture card device driver 100 is a software component that sets/controls various parameters associated with the video capture card. The device driver software is generally specific to the manufacturer of the video capture card and usually supplied by the card manufacturer. For example, the Filter Graph Manager program (GraphEdit®) supplied by Microsoft corporation with the associated DirectX® Software Developer's Kit (SDK) presents the video capture card drivers as a capture device with various image properties 210 associated with the video processing amp 214 that can be manually adjusted using slider bars or attribute values 220 displayed by a graphical user interface 200. Image properties or attributes 210 available for manual or automatic control may vary based on the particular camera, video capture card, and version of device driver. For the representative embodiment illustrated, image properties that may be adjusted include brightness, contrast, hue, saturation, sharpness, gamma, white balance, and backlight compensation. As described in greater detail below, systems and methods according to the present disclosure interface directly with the device driver to automatically adjust at least one image property to reduce the data size of an associated captured video frame below a threshold so that subsequent processing provides a video data packet having a size suitable for transmission over a low bit-rate network as generally represented by block 134. The device driver may also be used to control or select the output format for the video provided by the capture card, which may depend on the format(s) provided by the connected camera(s). For example, the device driver may be used to select RGB output or YUYV output if both formats are made available by an attached camera.

Video data supplied by video capture card device driver 100 with selected properties attributes values as represented by the GUI of FIG. 3 is passed to a color space converter 110 that transforms output from the camera to a first color palette for further processing. This reduces the packet size by quantizing color information using a palette having a smaller number of color values than the standard RGB bit values. In one embodiment, color space converter 110 transforms camera output to an eight-bit RGB color palette (RGB-8). Both the raw RGB values and the color palette are pushed to the next cascading stage as represented by sample grabber 120, which intercepts data that would normally be destined for display on a local monitor associated with server 32. Sample grabber 120 intercepts this data for further processing as generally represented by blocks 132 through 146. Null renderer 130 is provided to comply with DirectX® requirements for proper functioning of the filter graph in a representative embodiment, but otherwise plays no role in processing of the video stream.

Video data intercepted by sample grabber 120 is stored in a circular FIFO sample or frame buffer 132. Frame buffer 132 is a memory location that temporarily stores a prescribed number of frames or amount of video data with the oldest frame being discarded each time a new frame arrives in a first-in, first-out (FIFO) fashion. Multiple frames may be stored for processing in frame buffer 132 with the number of frames depending on the particular application and implementation. In one embodiment, frame buffer 132 holds only one frame for processing at a time.

The data size of the video frame currently selected for processing is examined by packet size reduction control 134, which automatically adjusts a selected image property or attribute to reduce the data size of the captured video frame, compares the resulting data size to a first threshold, and repeatedly adjusts each of the plurality of images properties in sequence until the resulting data size is below the corresponding threshold. The threshold may be dynamically modified based on currently available cellular network bandwidth. Frames having a size that exceeds the associated threshold may be discarded. Packet size reduction control 134 continues iteratively examining frame data size and adjusting one or more image properties or attributes via video capture card device driver 100 to produce frames with data size below the threshold. This process may take 30-50 frames to stabilize and is typically only required at the beginning of a video stream, or when the video content or available network bandwidth changes significantly. However, the process may be repeated as often as necessary to meet the required system parameters, such as image quality, network bandwidth, and corresponding video packet data size.

An optional frame-in-frame manipulation may be performed as represented by block 136. For various compression strategies, higher compression efficiency may be obtained by processing a larger chunk of data. As such, a data reduction advantage may be obtained according to the present disclosure by combining multiple frames into a single composite frame having a larger size. In one embodiment, each captured video frame n has a vertical resolution of r pixels and a horizontal resolution of c pixels. The frame-in-frame manipulation 136 combines $n^2$ frames in an n-by-n array to form a single composite frame having a vertical resolution of nr and a horizontal resolution of nc. The composite frame is then processed as a single frame. For applications that do not include frame-in-frame manipulation 136, the captured frame of suitable data size is passed directly from block 134 to block 138.

Each frame is converted to a bitmapped image format using a lossless compression algorithm to generate a first compressed frame in a format native to the hand-held computing device 64 (FIG. 1) as represented by block 138. The present disclosure is independent of the particular algorithm and format utilized. However, the Portable Network Graphics or PNG format specifies a lossless compression algorithm and bitmapped image format for still images that is suitable for use in video streaming to a hand-held device as described herein. As such, in the representative embodiment illustrated in FIG. 2, block 138 converts the captured video frame data from RGB-8 to a first (eight-bit) PNG format (PNG-8) using a standard PNG library with the PNG-8 representation buffered in memory. This results in an average packet size reduction of about 67%.

Buffer manipulation as represented by block 140 may be used to remove at least one header or other overhead data block from the PNG data to further reduce the packet size. As used herein, a header specifies administrative or overhead information used in packetizing the data and may include data fields located anywhere in a formatted packet or file, such as at the beginning of the file, at the end of the file (sometimes called a footer or trailer), or in the middle of the packet/file. In general, a standard PNG file includes a PNG signature followed by a series of data chunks, some of which are designated critical chunks. In one embodiment, non-critical chunks are removed by buffer manipulation 140 including the "IHDR" chunk, the "IEND" chunk, and the PNG signature leaving only the "IDAT" chunk to further reduce packet size for subsequent processing and transmission over the low bit-rate network.

A second PNG compression is performed as represented by block 142. The second PNG compression uses a PNG library to compress/convert the frame data to a second PNG format. In one embodiment, block 142 converts the frame data from PNG-8 to PNG-4 or four-bit PNG representing 16 colors and providing another 33% reduction in packet size. The resulting frame data is again compressed using a second lossless compression algorithm as represented by block 144 to generate a compressed packet for transmission. In one embodiment an arithmetic coding algorithm is applied. As known by those of ordinary skill in the art, arithmetic coding is a form of variable-length entropy encoding that converts a string into another representation that represents frequently used characters using fewer bits and infrequently used characters using more bits with the goal of using fewer bits in total. In contrast to other entropy encoding techniques that separate the input message into its component symbols and replace each symbol with a code word, arithmetic coding encodes the entire message into a single number between zero and one. In one embodiment, a varying code word or alphabet that changes dynamically from packet to packet is used with the alphabet represented by changes from a previous alphabet, which is only periodically transmitted (after some number of frames). When the new alphabet is transmitted, it is sent as the characters that have changed relative to the last transmitted alphabet, which significantly decreases the size and number of alphabet transmissions.

Pseudodata manipulation is then performed on the resulting compressed video frame as represented by block 146. Pseudodata manipulation is a frame replenishment strategy that takes advantage of the considerable similarity between successive frames. Portions of the image that do not change over two or more frames are not transmitted. At the display, these portions are reconstructed simply by repeating from the previous frame. The changing portions of the image that are sent are coded with varying resolution depending on subjective requirements for acceptable picture quality and the bandwidth available for transmission. For example, a first frame is sent in its entirety with the next three frames captured by the camera discarded. The first frame is then compared with frame 5 to determine the differences or changes between these non-consecutive captured frames with only the differences or changes compressed, coded, and transmitted. On average, sending only the changes relative to a previous frame may result in a 50% reduction of transmitted data. At the hand-held receiving device, the first frame is used in combination with the changes to generate the complete fifth frame. A smoothing algorithm is then used to replenish or fill-in intervening frames. The combination of discarding frames and transmitting only the changed data allows creation of five frames from the equivalent of 1.5 frames of data to achieve an overall reduction of transmitted data of around 70% relative to transmitting five full frames of data.

Figure 4:
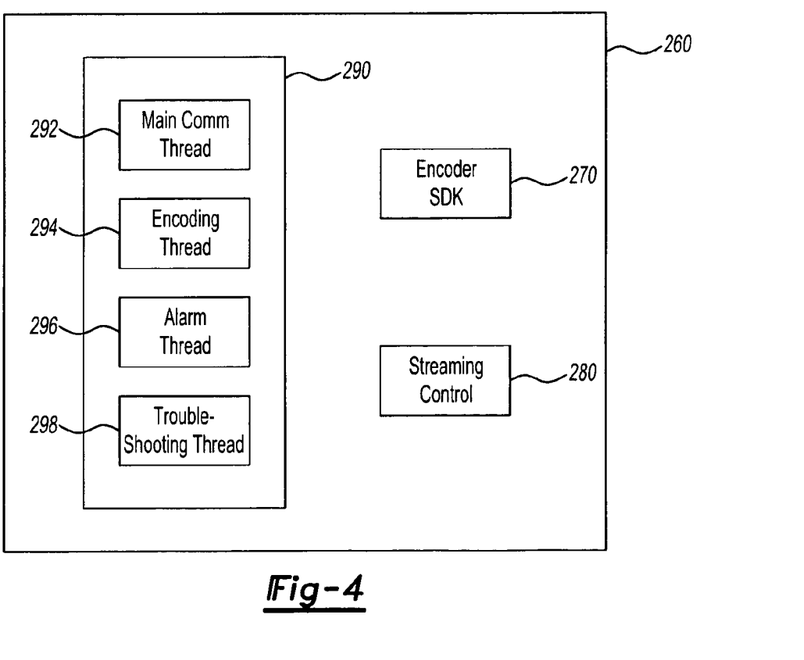
FIG. 4 illustrates a computer readable storage medium for storing software that may include various functions for streaming video to a hand-held device according to embodiments of the present disclosure.

Referring now to FIG. 4, a block diagram illustrating organization of software running on the server computer for video streaming according to the present disclosure is shown. The server software may be stored on a computer readable medium 260, such as a computer hard disk, for access by one or more processors during execution of the software. The main communication software 290 includes a main communication thread 292, an encoding thread 294, an alarm thread 296, and a troubleshooting thread 298. Software 290 operates as the communication server for the client software installed on the mobile device 64 (FIG. 1), as well as the main integration software component on the server 32 (FIG. 1). In this representative embodiment, the DirectX® subsystem contained within all versions of Windows® software is encapsulated by the encoder SDK 270. This allows the streaming control software 280 to start and stop capture of video in addition to processing and compressing the captured video stream. As previously described, the video stream is captured and processed only in response to a request from an authenticated mobile device to improve security and to conserve processing resources.

Server software 290 includes several threads running concurrently as represented by blocks 292, 294, 296, and 298. Main communications thread 292 functions as the main entry point into the server system and processes all network-based communications, mainly from the client software 70 (FIG. 1). Main communications thread 292 is responsible for negotiating and establishing the logical connection or communication link 72 (FIG. 1). Encoding thread 294 is responsible for capturing and encoding a video steam as requested by the client software. Alarm thread 296 monitors any alarm interface to determine whether an alarm or trigger event has occurred as determined by a voltage change according to the alarm specifications. In one embodiment, alarm thread 296 checks the alarm interface at periodic intervals, such as every 30 seconds. Of course, the monitoring frequency may vary depending upon the particular triggering event being monitored and depending on the specific application and implementation. Troubleshooting thread 298 monitors the state of the current logical connection 72 (FIG. 1). If a breach in that connection is detected, the entire session is dumped or discarded to release the server resources for further use. As previously described, the encoder SDK 270 wraps or encapsulates the DirectX® subsystem and allows an application to capture and process video. Streaming control 280 is the streaming server portion that allows multiple clients to connect to various available video streams after authentication.

In operation, and with reference to FIGS. 1 and 4, server software 290 remains idle waiting for a client connection request from client software 70 installed on a hand-held mobile device 64, while alarm thread 296 monitors alarm/trigger signals of alarm system 34 provided by a data acquisition system or ADC card installed in server 32. If the alarm voltage exceeds a specified value (depending upon the particular system being used), this will trigger alarm thread 296 to send a message (text/SMS or email, for example) to the mobile device to alert the end user of the trigger event. The message may be composed by server 32 and relayed to an email server through an ISP, directly to the end user via SMS/text messaging to the cellular telephone number, or via a third-party monitoring service, for example.

The client software 70 on mobile hand-held computing device 64 may be used to request a corresponding video stream in response to an alert message, or simply upon initiation by the user without requiring an alert or alarm trigger. When a communication request from client software 70 on hand-held mobile device 64 is received by server 32, communication thread 292 completes TCP/IP negotiation and requests authentication of hand-held device 64, which may include automatic transmission of a mobile device ID, such as a serial number, or other code that may be embedded within the hardware and/or software on the mobile device. A password or PIN entered by the user may also be required to enhance security and prevent unauthorized users from accessing streaming video if the hand-held device is lost or stolen. Once the authentication is successfully completed, a capture and encoding session is initiated by encoding thread 294 and encoder SDK 270. Streaming control 280 then manages delivery of the packetized video data to the appropriate mobile device 64, while troubleshooting thread 298 continues to monitor the session status. If the streaming session is interrupted, troubleshooting thread 298 ends the session on server 32 to release server resources for future use. Once an authenticated communication link has been established, mobile device 64 may be used to control appropriately equipped cameras 14, 16, 18, or 20 and/or initiate video streaming sessions from other cameras without additional authentication.

Figure 5:
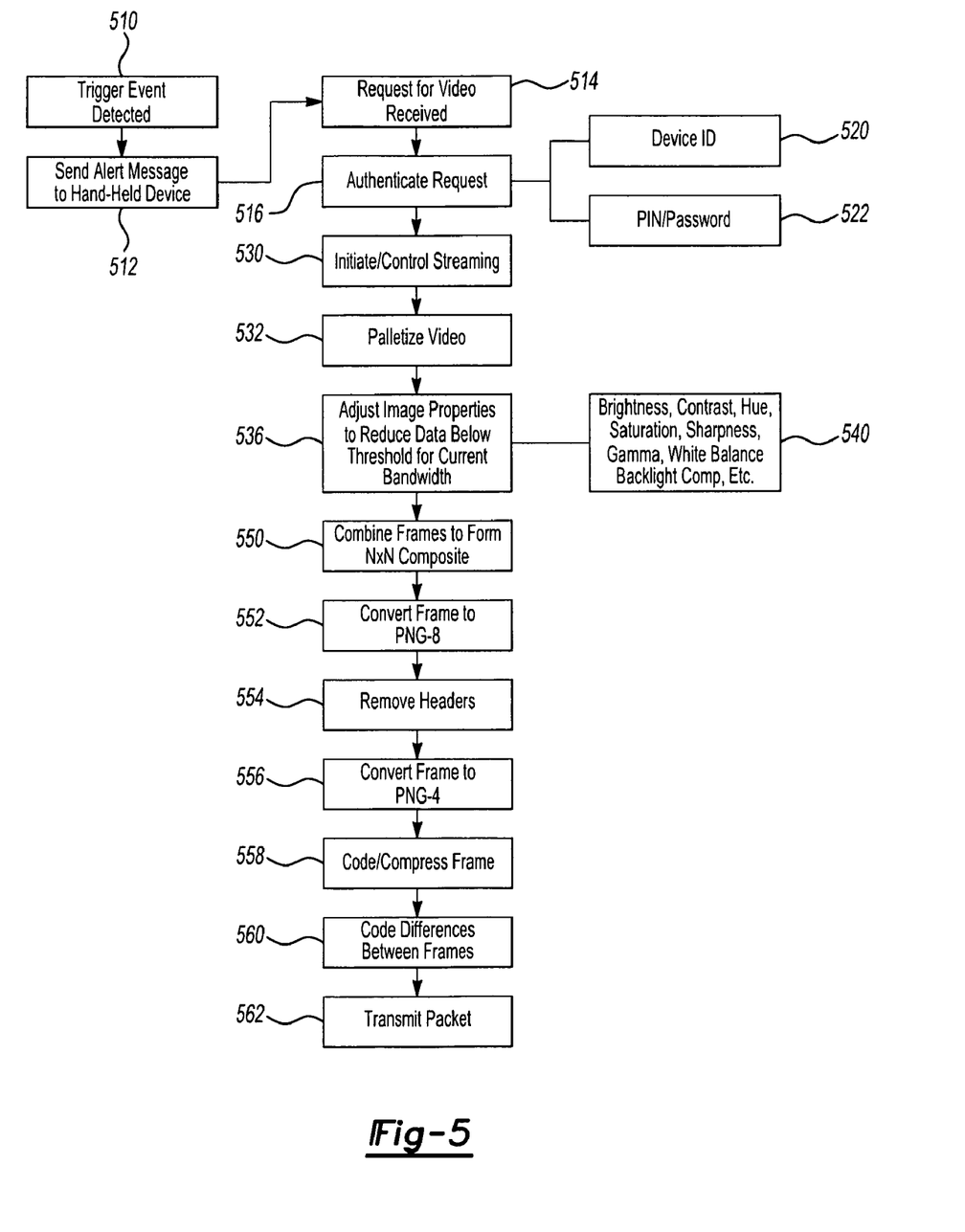
FIG. 5 provides a more detailed flow chart illustrating operation of a system or method for streaming video performed by a video server using data reduction, coding, and compression strategies according to embodiments of the present disclosure.

FIG. 5 provides an alternative representation of the operation of a system or method for streaming video performed by a server computer using data reduction, coding, and compression strategies according to embodiments of the present disclosure. Block 510 represents detecting a trigger event or alert associated with at least one video source or camera and, in response, sending a message to at least one user of a hand-held device based on the alert to request streaming video associated with the at least one camera be transmitted to the hand-held device as represented by block 512. Those of ordinary skill in the art will recognize that the functions and/or components associated with implementation of blocks 510 and 512 are optional. When provided, these features alert the user of the trigger event by sending a message, such as a text/SMS message to the hand-held device to elicit a user request for viewing associated streaming video.

Block 514 represents receiving a request for streaming video form a hand-held computing device. The request may be in response to an alert message provided by block 512, or user-initiated without regard to any alert. The system and method include determining that the hand-held device is authorized to receive requested streaming video by initiating an authentication request as represented by block 516. Determining that the device is authorized may include determining an embedded device identification (ID) code as represented by block 520 and/or processing a password entered by a user as represented by block 522. An embedded device ID may be stored in hardware and/or software on the device and may be automatically transmitted with messages sent by the device, such as a device serial number, for example. The device ID may also include information relative to the client software version, operating system, device type, etc. In one embodiment, the device ID may include a cellular telephone identification code.

Once the hand-held device is authenticated, the initiation/control of a video streaming session is started as represented by block 530. The initiation/control may include a video source selection corresponding to one of a plurality of available cameras as specified by a configuration file stored on the mobile device. The video data may be palletized as represented by block 532 by transforming output form an associated video source, such as a camera, to a first color palette. In one embodiment, camera output is transformed to an RGB-8 color palette. The system and method continue by adjusting each of a plurality of image properties until a captured video frame data size is below a corresponding threshold. The threshold may be dynamically modified based on currently available network bandwidth or based on the average content of a particular video source, for example. Image properties or attributes may be adjusted by controlling a device driver associated with the video source and/or the video capture card installed in the server computer. Image properties may include at least two properties selected from brightness, contrast, hue, saturation, sharpness, gamma, white balance, and backlight compensation as represented generally by block 540. Although these attribute or property names/labels are generally standardized, the names/labels may vary and different attributes may be available depending upon the particular video capture card manufacturer, camera manufacturer, device driver supplier, etc.

Those of ordinary skill in the art will appreciate that the process represented by block 536 is an iterative process that may require on the order of 30-40 frames to stabilize depending on the particular frame content and initial values. In general, once established, attribute values will remain within a small range dependent upon the average image content and camera settings. The process may be repeated as necessary to adjust to available network bandwidth. In one embodiment, block 536 adjusts a selected image property to reduce the data size of the captured video frame, compares the resulting size to a threshold, and repeatedly adjusts additional selected attributes while comparing each resulting frame to the threshold. The process is then repeated by further adjusting the first selected image property or attribute until the frame data size is below the threshold. Various constraints may be placed on the process for individual attributes so that the resulting streaming video remains acceptable quality for the user to view on the hand-held device.

Block 550 of FIG. 5 represents an optional process for enhancing the compression ratio of the resulting video data packets by combining multiple image frames to form a single composite frame. In general, the process combines $n^2$ frames in an n by n array, i.e. n frames across and n frames down and treats the resulting array as a single frame for further processing. As such, if each frame has a vertical resolution of r pixels and a horizontal resolution of c pixels, the resulting combined frame would have a vertical resolution of nr and a horizontal resolution of nc. The frame data passes to block 552, which includes converting the captured video frame data to a first bitmapped image format using a lossless compression algorithm to generate a first compressed frame. The bitmapped image format may be a format native to the hand-held device. In the representative embodiment illustrated, the frame data is converted to eight-bit PNG format (PNG-8) using the lossless compression algorithm specified by the PNG format. Most formats include various field identifiers, header/trailer information, etc. provided to enhance compatibility among various systems that may be removed for interim processing to further reduce the packet data size as represented by block 554. For example, the PNG format includes a file signature followed by a series of chunks with block 554 removing the file signature, the IHDR chunk, and the IEND chunk to further reduce the packet size. The resulting frame data is then converted to a second bitmapped image format using a lossless compression algorithm, such as PNG-4 in the illustrated embodiment. The compressed frame is then coded and further compressed using an arithmetic coding strategy as represented by block 558.

Additional data reduction may be accomplished by the optional processing represented by block 560 where selected frames are discarded and the remaining frames are processed to determine differences between the frames with only the difference being coded as previously described in detail. The resulting data packet is then transmitted by the streaming server to the cellular provider over the internet for wireless transmission to the hand-held mobile computing device.

Figure 6:
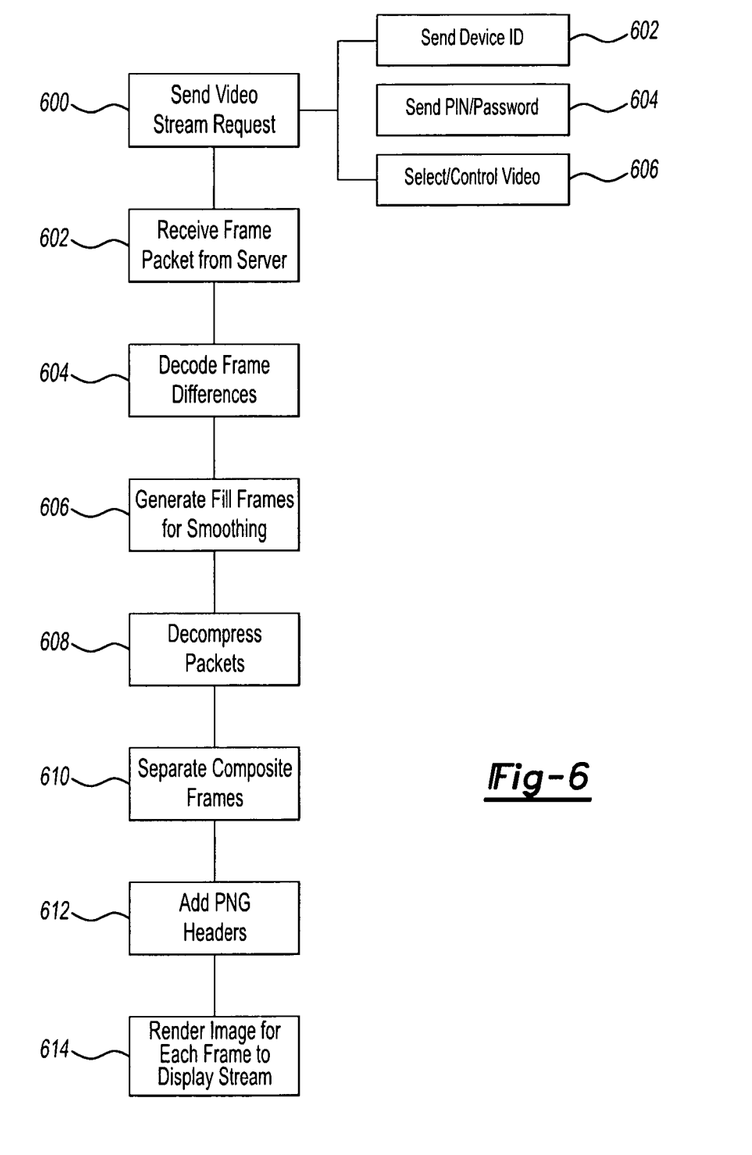
FIG. 6 is a block diagram illustrating operation of a method for displaying video streamed over a wireless network on a hand-held computing device according to embodiments of the present invention.

Referring now to FIG. 6, a block diagram illustrating operation of a system or method for displaying video streamed over a wireless network on a hand-held computing device according to one embodiment of the present invention is shown. The various functions illustrated generally represent the process implemented by client software 70 to generate a stream of image frames on a display 66 of hand-held device 64 using received video packets. When the client application is launched, the end user may select a particular location and a particular video source for viewing as part of the video stream request as represented by blocks 600 and 606. Authentication information, such as a device ID and/or PIN/password may also be supplied to the server to establish an authenticated session as represented by blocks 604 and 606, respectively. Once authenticated, the client application will begin to receive frame data packets for the selected video source as represented by block 602, and may spawn another process to begin rendering image frames decoded by blocks 604-612 on the display device as represented by block 614.

The optional process represented by blocks 604 and 606 recreates frames that were discarded to reduce the data packet size prior to transmission by the server by decoding the packet information to generate differences relative to a base or reference image frame. The resulting image frame and the reference image frame are supplied to a smoothing or frame replenishing process as represented by block 606 to fill in intervening frames. The frames are then decompressed or decoded as represented by block 608. The optional process represented by block 610 is employed to decompose or separate individual frames if the corresponding frame-in-frame compositing process was used by the server. The resulting data packet is properly formatted for the desired image format as represented by block 612. For example, in the representative embodiment illustrated, the PNG file signature, IHDR chunk and IDAT chunk are added to properly format the file for rendering of the image as represented by block 614. The process is repeated for subsequent image frames to generate a video stream based on sequential rendering of bitmapped images.

As such, embodiments according to the present disclosure combine or cascade various compression, encoding/decoding, and data reduction strategies to generate a lightweight or lower bandwidth stream of data packets representing video information for transmission to a portable hand-held device over a relatively low bandwidth/bit-rate, and generally unreliable network, such as a cellular network, for example. The data packets received by the mobile device are manipulated in near real-time to produce a recognizable video stream on the mobile device with camera to user latency times on the order of just seconds. Security features allow only authorized users to initiate, control, and view a selected video stream. The client/server architecture employs a hardened server with a minimal operating system to facilitate installation of the server on the public side of a network firewall, or in a firewall demilitarized zone, if desired. Additional security features include capturing and processing video data for transmission only after an authenticated hand-held device requests streaming video with authentication provided by a security code or number embedded in the device hardware or software in addition to entry of a user PIN or password. A mobile user can select from available video streams and may have the ability to remotely control one or more appropriately equipped video sources once the hand-held device is authenticated. The scalable design illustrated by representative embodiments of the present disclosure allows a single server implementation to process data from multiple cameras providing near real-time video streaming to multiple users substantially simultaneously.

In addition, the video streaming systems and methods of the present disclosure have the ability to transmit packetized video data using streaming technology native to the mobile devices for display of still images, i.e. developed specifically for mobile devices to facilitate viewing of full motion video over a low bit-rate network, i.e. at less than modem speeds using a client application based on video player technology rather than web page still image display technology to reduce transmission bandwidth and processing requirements of the mobile device.

Embodiments of the present disclosure may be easily integrated into existing video surveillance or security applications interfacing with access control, intrusion detection, security, and automation systems, for example. Alerts, such as text messages, emails, or other information may be transmitted to mobile users in response to a security trigger being activated at a monitored site.

While one or more embodiments have been illustrated and described, these embodiments are not intended to illustrate and describe all possible embodiments within the scope of the claims. Rather, the words used in the specification are words of description rather than limitation, and various changes may be made without departing from the spirit and scope of the disclosure. While various embodiments may have been described as providing advantages or being preferred over other embodiments or prior art implementations with respect to one or more desired characteristics, as one skilled in the art is aware, one or more features or characteristics may be compromised to achieve desired overall system attributes, which depend on the specific application and implementation. These attributes include, but are not limited to: cost, durability, life cycle cost, marketability, packaging, size, serviceability, etc. The embodiments discussed herein that are described as less desirable than other embodiments or prior art implementations with respect to one or more characteristics are not outside the scope of the disclosure and may be desirable for particular applications or implementations.

What is claimed is:

1. A method for streaming video over a cellular network to a hand-held device, the method comprising:
   receiving a request for streaming video from the hand-held device;
   determining that the hand-held device is authorized to receive requested streaming video;
   capturing video frames from at least one camera wherein each captured video frame, n, has a vertical resolution of r pixels and a horizontal resolution of c pixels;
   transforming output from the camera to a first color palette;
   adjusting each of a plurality of image properties until the captured video frame data size is below a first threshold;
   combining $n^2$ frames into a single n by n composite frame having a vertical resolution of n times r pixels and a horizontal resolution of n times c pixels;
   converting the captured video frame data to a bitmapped image format using a lossless compression algorithm to generate a first compressed frame in a format native to the hand-held device;
   compressing the first compressed frame using at least a second lossless compression algorithm to generate a compressed packet for transmission; and
   transmitting the compressed packet over a wireless network to the hand-held device for display on the hand-held device.

2. The method of claim 1 further comprising converting the first compressed frame to a second bitmapped image format prior to compressing the first compressed frame.

3. The method of claim 1 wherein determining that the hand-held device is authorized comprises:
   determining an identification code embedded in the device is an authorized identification code.

4. The method of claim 3 wherein determining that the hand-held device is authorized further comprises:
   processing a password entered by a user to determine if the hand-held device is authorized.

5. The method of claim 1 further comprising:
   detecting an alert associated with the at least one camera; and sending a message to at least one user of a hand-held device based on the alert to request streaming video associated with the at least one camera be transmitted to the hand-held device.

6. The method of claim 5 wherein sending a message comprises sending a message to the hand-held device.

7. The method of claim 6 wherein sending a message comprises sending a text message.

8. The method of claim 1 wherein transforming output from the camera comprises transforming camera output to an eight-bit RGB color palette.

9. The method of claim 1 wherein the plurality of image properties comprises at least two image properties selected from brightness, contrast, hue, saturation, sharpness, gamma, white balance, and backlight compensation.

10. The method of claim 1 wherein adjusting comprises: adjusting a selected image property to reduce the data size of the captured video frame; comparing the resulting data size of the captured video frame to the first threshold; and repeatedly adjusting each of the plurality of image properties in sequence and comparing the resulting data size to the first threshold until the resulting data size is below the first threshold.

11. The method of claim 1 wherein converting the captured video frame comprises converting the captured video frame to a PNG format.

12. The method of claim 1 wherein compressing the first compressed frame comprises arithmetically coding the first compressed frame to generate a compressed packet for transmission.

13. The method of claim 1 further comprising dynamically adjusting the first threshold in response to currently available network bandwidth.

14. The method of claim 1 further comprising converting the first compressed frame to a second bitmapped image format prior to compressing the first compressed frame for transmission.

15. The method of claim 14 wherein the first and second bitmapped image formats comprise PNG formats.

16. The method of claim 1 wherein the bitmapped image format is a PNG format, the method further comprising removing at least one header from the bitmapped image format prior to compressing the first compressed frame.

17. The method of claim 1 wherein transmitting comprises transmitting the compressed packet over a cellular telephone network.

18. The method of claim 1 wherein receiving a request for streaming video comprises receiving a video source selection from the hand-held device corresponding to one of a plurality of cameras.

19. The method of claim 1 further comprising:
determining differences of spatial information between temporally adjacent captured video flames; and
transmitting the differences in place of the original packets to the hand-held device for selected video frames.

20. The method of claim 1 further comprising: decompressing compressed packets received by the hand-held device; attaching headers to the received packets to create PNG formatted flames; and
displaying streaming video on the hand-held device by sequentially displaying the PNG formatted flames.

21. A method for streaming video over a network, the method comprising:
capturing video frames from a video source wherein each captured video frame, n, has a vertical resolution of r pixels and a horizontal resolution of c pixels;
adjusting a plurality of image properties in sequence and repeating the sequence until a captured video frame data size is below a corresponding threshold data size;
combining $n^2$ frames into a single n by n composite frame having a vertical resolution of n times r pixels and a horizontal resolution of n times c pixels;
converting the captured video frame to a bitmapped image format using a first lossless compression algorithm to generate a first compressed frame;
compressing the first compressed frame using at least a second lossless compression algorithm to generate a compressed packet for transmission;
transmitting the compressed packet over the network to a network computing device;
decompressing the compressed packet using the network computing device; and
rendering an image based on the decompressed packet on a display associated with the network computing device.

22. The method of claim 21 further comprising: converting the first compressed file to a second bitmapped image format file using a lossless compression algorithm before compressing the first compressed file.

23. The method of claim 21 wherein converting the captured video frame comprises converting the captured video frame to a PNG format file.

24. The method of claim 21 further comprising: converting output from a video source to a palletized RGB format prior to converting the captured video frame to a bitmapped image format file.

25. The method of claim 21 wherein the network computing device comprises a cellular telephone and wherein the method is initiated in response to receiving a request for streaming video from an authorized cellular telephone as determined by an automatically transmitted cellular telephone identification code.

26. The method of claim 21 further comprising, prior to adjusting the plurality of image properties:
receiving an alert associated with at least one video source;
transmitting a message to the network computing device in response to the alert; and
authenticating a request for video streaming from the network computing device based on an identification code automatically transmitted by the network computing device.

27. The method of claim 21 further comprising:
processing two temporally spaced, non-consecutive captured video frames to determine differences; and
storing the differences as the captured video frame file prior to converting the captured video frame.

28. A system for streaming video over a cellular network to a hand-held computing device having a display screen, the system comprising:
at least one video source;
a server having a video capture card in communication with the at least one video source for capturing video frames, n, each having a vertical resolution of r pixels and a horizontal resolution of c pixels, the server including a video capture card device driver and software that controls the device driver to automatically adjust each of a plurality of image properties until a captured video frame data size is below a first threshold associated with currently available bandwidth of the cellular network, the server combining $n^2$ frames into a single n by n composite frame having a vertical resolution of n times r pixels and a horizontal resolution of n times c pixel, the server converting captured video frames to a bitmapped image format using a lossless compression algorithm to generate compressed video frames, further compressing the compressed video frames using a second lossless compression algorithm to generate compressed packets for transmission, and streaming the compressed packets over the cellular network to the hand held computing device for sequential display on the display screen.

29. The system of claim 28 further comprising an alarm system in communication with the server, wherein the server sends a message to the hand-held computing device in response to activation by the alarm system, and initiates video streaming to the hand-held computing device in response to receiving an authenticated request from the hand-held computing device.

30. The system of claim 28 wherein the server determines differences between two captured frames and wherein converting the captured video frames comprises converting the differences between two captured frames to the bitmapped image format.

31. The system of claim 28 wherein the server initiates video streaming in response to a request from the hand-held computing device only after authenticating the hand-held computing device based on at least a device code automatically transmitted by the hand-held computing device.

* * * * *

UNITED STATES PATENT AND TRADEMARK OFFICE
CERTIFICATE OF CORRECTION

| | | |
|---|---|---|
| PATENT NO. | : 8,259,816 B2 | Page 1 of 1 |
| APPLICATION NO. | : 12/402595 | |
| DATED | : September 4, 2012 | |
| INVENTOR(S) | : Marquis R. Coleman, Sr. | |

It is certified that error appears in the above-identified patent and that said Letters Patent is hereby corrected as shown below:

Column 15, Line 50, Claim 20:

After "to create PNG-formatted" delete "flames" and
Insert -- frames --.

Column 15, Line 52, Claim 20:

After "displaying the PNG formatted" delete "flames" and
Insert -- frames --.

Signed and Sealed this
Twenty-seventh Day of November, 2012

David J. Kappos
*Director of the United States Patent and Trademark Office*